United States Patent
Lais et al.

(10) Patent No.: US 10,133,694 B2
(45) Date of Patent: *Nov. 20, 2018

(54) PERIPHERAL COMPONENT INTERCONNECT EXPRESS (PCIE) PSEUDO-VIRTUAL CHANNELS USING VENDOR DEFINED MESSAGES

(71) Applicant: International Business Machines Corporation, Armonk, NY (US)

(72) Inventors: Eric N. Lais, Georgetown, TX (US); Adalberto G. Yanes, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 164 days.

This patent is subject to a terminal disclaimer.

(21) Appl. No.: 14/869,381

(22) Filed: Sep. 29, 2015

(65) Prior Publication Data

US 2017/0068637 A1 Mar. 9, 2017

Related U.S. Application Data

(63) Continuation of application No. 14/848,929, filed on Sep. 9, 2015.

(51) Int. Cl.
*G06F 13/16* (2006.01)
*G06F 13/28* (2006.01)
*G06F 13/42* (2006.01)
*G06F 13/40* (2006.01)

(52) U.S. Cl.
CPC .............. *G06F 13/28* (2013.01); *G06F 13/16* (2013.01); *G06F 13/4022* (2013.01); *G06F 13/4282* (2013.01)

(58) Field of Classification Search
CPC .......... G06F 13/16; G06F 13/28; G06F 13/42; G06F 13/4022; G06F 13/4282
See application file for complete search history.

(56) References Cited

U.S. PATENT DOCUMENTS

| | | | |
|---|---|---|---|
| 7,165,131 B2 | 1/2007 | Creta et al. | |
| 8,122,177 B1 * | 2/2012 | Puranik | G06F 13/28 710/308 |
| 8,295,293 B1 * | 10/2012 | Brown | H04L 47/39 370/401 |

(Continued)

OTHER PUBLICATIONS

IBM "List of IBM Patents or Patent Applications Treated as Related".

(Continued)

*Primary Examiner* — Henry Tsai
*Assistant Examiner* — Christopher A Daley
(74) *Attorney, Agent, or Firm* — Patterson + Sheridan, LLP

(57) ABSTRACT

Embodiments of the present disclosure use vendor defined messages (VDMs) to send high priority information (e.g., cache writebacks) on a designated channel that is separate from a channel used for other commands (e.g., normal memory write commands). By using VDMs and a designated channel to send cache writebacks, the cache writebacks will not be blocked by normal memory write commands. For example, an endpoint device may encode cache writebacks as VDMs to be sent to a root complex. The root complex may store the VDMs in a dedicated VDM buffer and send the VDMs on a dedicated VDM channel.

16 Claims, 7 Drawing Sheets

(56) References Cited

U.S. PATENT DOCUMENTS

| | | | |
|---|---|---|---|
| 8,463,881 B1 | 6/2013 | Baker et al. | |
| 8,745,287 B2 | 6/2014 | Shima | |
| 8,819,306 B2 | 8/2014 | Ajanovic et al. | |
| 9,477,631 B2* | 10/2016 | Debbage | G06F 13/4221 |
| 9,483,424 B1* | 11/2016 | Johns | G06F 13/1673 |
| 2006/0259656 A1* | 11/2006 | Sullivan | H04L 41/145 |
| | | | 710/22 |
| 2013/0325998 A1* | 12/2013 | Hormuth | G06F 15/17331 |
| | | | 709/212 |
| 2014/0281070 A1 | 9/2014 | Natu et al. | |
| 2015/0378737 A1* | 12/2015 | Debbage | G06F 12/0875 |
| | | | 712/225 |
| 2016/0011987 A1* | 1/2016 | Bouley | G06F 12/1081 |
| | | | 710/308 |
| 2016/0026602 A1* | 1/2016 | Narayana | G06F 13/4221 |
| | | | 710/106 |
| 2016/0359768 A1* | 12/2016 | Narkis | H04L 49/3009 |
| 2017/0068626 A1* | 3/2017 | Lais | G06F 13/16 |
| 2017/0070363 A1* | 3/2017 | Watkins | H04L 12/423 |
| 2017/0070636 A1 | 3/2017 | Sekiya | |
| 2017/0171075 A1* | 6/2017 | Sajeepa | H04L 45/745 |

OTHER PUBLICATIONS

U.S. Appl. No. 14/848,929, entitled Diagnosing Peripheral Component Interconnect Express (PCIE) Pseudo-Virtual Channels Using Vendor Defined Messages, filed Sep. 9, 2015.

\* cited by examiner

PERIPHERAL COMPONENT INTERCONNECT EXPRESS (PCIE) PSEUDO-VIRTUAL CHANNELS USING VENDOR DEFINED MESSAGES

CROSS-REFERENCE TO RELATED APPLICATIONS

This application is a continuation of co-pending U.S. patent application Ser. No. 14/848,929 filed Sep. 9, 2015. The aforementioned related patent application is herein incorporated by reference in its entirety.

BACKGROUND

Peripheral Component Interconnect Express (PCIe) Architecture has a mechanism for implementing virtual channels (VCs) within a PCIe port. VCs provide a means to support multiple independent logical data flows over a given common physical resources of a PCIe link. Conceptually this involves multiplexing different data flows onto a single physical link.

SUMMARY

Certain embodiments of the present disclosure provide a method performed by a first device of a PCIe communication interface. The method generally includes determining at least memory write information to be sent to a second device via a PCIe link; encoding the memory write information as a vendor defined message (VDM); and sending the VDM to the second device over the PCIe link.

Certain embodiments of the present disclosure provide a method performed by a first device of a PCIe communication interface. The method generally includes receiving a message from a second device of the PCIe interface, wherein the message comprises at least one memory write information, wherein the memory write information is encoded as a vendor defined message (VDM); storing the VDM in a buffer dedicated to storing VDMs; and sending the VDM on a dedicated channel, wherein the channel is dedicated to sending VDMs.

DETAILED DESCRIPTION

Generally, embodiments of the present disclosure use vendor defined messages (VDMs) to send high priority information (e.g., cache writebacks) on a designated channel that is separate from a channel used for other commands (e.g., normal memory write commands). By using VDMs and a designated channel to send cache writebacks, the cache writebacks will not be blocked by normal memory write commands.

Figure 1:
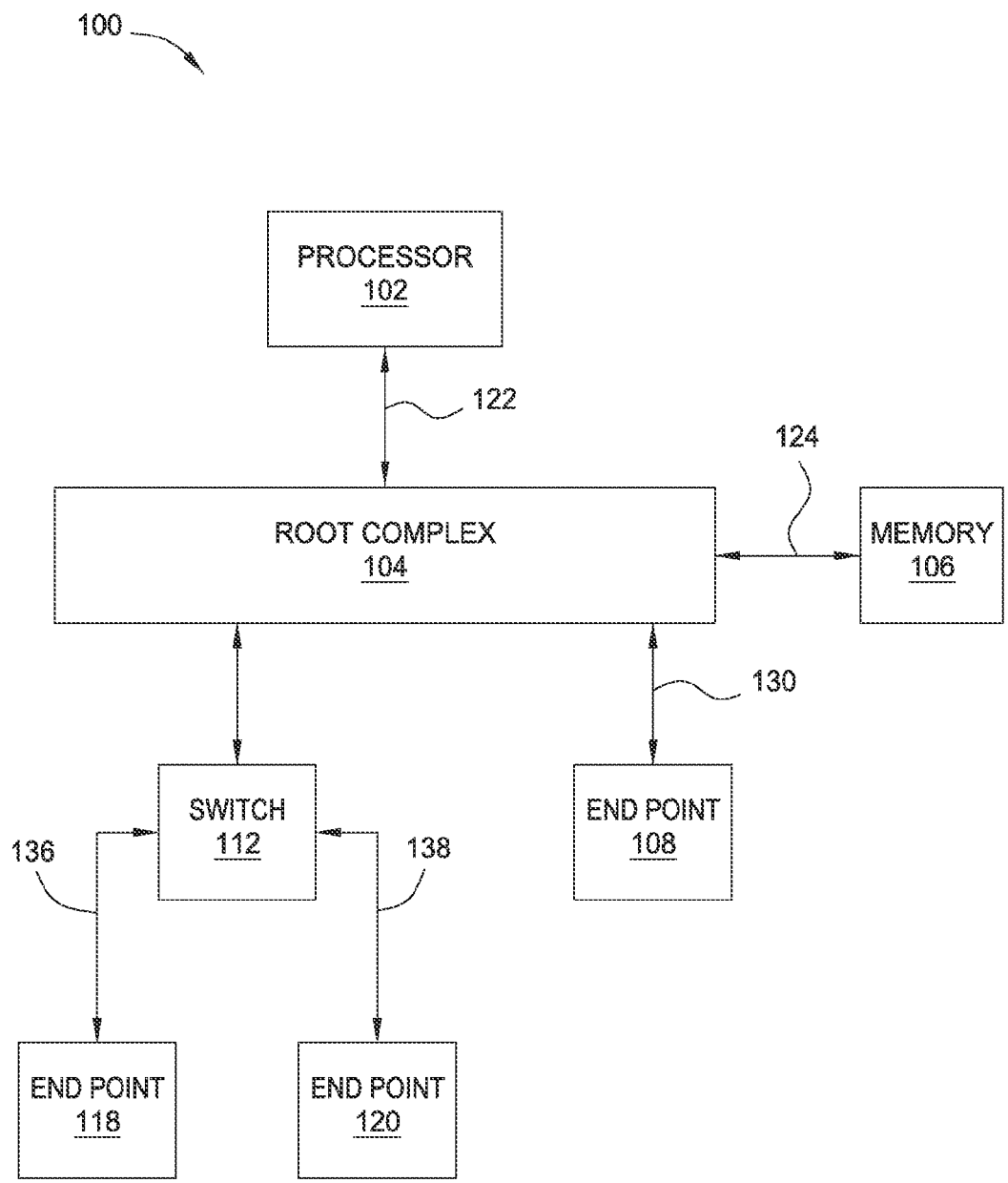
FIG. 1 illustrates a block diagram depicting an exemplary data processing system, according to certain embodiments of the present disclosure.

FIG. 1 illustrates a block diagram depicting an exemplary data processing system 100, according to certain embodiments of the present disclosure. As illustrated, data processing system 100 includes a processor 102, root complex 104, memory 106, PCI Express endpoints 108, 118, 120, and switch 112.

Root complex 104 is the root of an Input/Output (I/O) hierarchy and couples processor 102 (via interconnect 122) and memory 106 (via interconnect 124) to I/O systems such as switch 112, and PCI Express endpoint 108. PCI Express endpoint 108 represents a peripheral directly coupled to root complex 104 (i.e., without the means of a switch) via PCI Express interconnect 130. Switch 112 couples PCI Express endpoints 118 and 120 (via PCI Express interconnect 136 and 138).

Those with skill in the art will appreciate that the PCI Express endpoints may be implemented by any type of device that can be a requester or completer of a PCI Express transaction either on its own behalf or on behalf of a distinct non-PCI Express device. Moreover, those skilled in the art will appreciate that data processing system 100 can include many additional components not specifically illustrated in FIG. 1. Because such additional components are not necessary for an understanding of the present disclosure, they are not illustrated in FIG. 1 or discussed further herein. It should also be understood, however, that the enhancements to data processing system 100 for using VDMs to communicate memory write information according to certain embodiments of the present disclosure are applicable to data processing systems of any system architecture and are in no way limited to the generalized architecture illustrated in FIG. 1.

PCIe architecture has a mechanism for implementing virtual channels within a PCIe port (VCs). Virtual channels provide a means to support multiple independent logical data flows over given common physical resources of a PCIe Link. Conceptually this involves multiplexing different data flows onto a single physical Link. Embodiments of the present disclosure are generally directed to using VDMs to effectively create a pseudo-virtual channel (VC) for PCIe communication.

Systems using PCIe communication may need VCs to be used as a second channel to communicate certain information. For example, the second channel may be used for memory write information (cache writebacks, for example) that cannot be blocked by normal memory writes that may be communicated on a first channel. That is, a deadlock condition can occur where specific cache writebacks are not allowed to pass I/O direct memory access (DMA) write requests because of ordering rules. For example, the write requests may share a posted channel on PCIe and thus, it is possible for the I/O DMA writes to block passage of the cache writebacks. A second channel allows these cache writebacks to flow through the design without being blocked by the I/O DMA writes.

While VCs may be used to implement a second channel in PCIe architecture, VCs introduce several complexities and problems in hardware (HW), software (SW) and firmware (FW). For example, implementing a second channel via a VC may require VC capabilities and controls in the PCI configuration space which may cost chip area. Moreover, VC capabilities and controls may affect the address map of a design to add the additional structure.

Additional link level training packets may be needed to initialize all VCs, which introduces link layer state machine complexities. VCs also introduce transaction layer implementation complexity for managing credits across multiple VCs. Moreover, VC logic may have to be implemented on both ends of a PCIe link, e.g., in both the root and endpoint devices.

Using a VC as a second channel may also need SW/FW changes. That is, SW/FW may have to be used to set up the VC capabilities and controls in the PCI configuration space. In addition, SW/FW may have to initiate separate VC credit initialization sequences for each VC. High level SW/FW initialization coordination between root complex and endpoint may also be needed. VC in the root complex may have to be enabled before transaction layer packets (TLPs) are received from an endpoint to prevent malformed TLP errors.

In addition, the VC mechanism is not a typically supported option in the industry in many devices. For example, many PCIe switch vendors do not support VCs or only support VCs in a limited manner. This limitation may make certain system designs using VCs impractical.

Embodiments of the present disclosure use VDMs to create a second channel (e.g., a pseudo-virtual channel). The VDMs may be used to communicate cache writebacks, while memory write TLPs may be used to communicate DMA writes (e.g., normal writes). VDMs share the existing posted write channel with memory writes. Embodiments of the present disclosure use VDM writes to differentiate the cache writebacks from the normal memory write, thus, preventing the cache writebacks from being blocked by the normal memory writes.

VDMs are PCIe architected TLPs that allow a vendor to implement their own packet types on the PCIe link. VDMs are treated as posted write commands in PCIe architecture. VDMs are strictly ordered with memory writes as per the PCIe architecture. All posted TLPs are strictly ordered on the PCIe link. A basic TLP header is a message with data, where the message code is vendor defined.

As presented above, VDMs share posted channel with memory write TLPs. In certain embodiments of the present disclosure, VDMs may be configured to pass normal writes in the root complex. Thus, VDMs may not be blocked by normal writes. Using VDMs as a means to implement a second channel may need minimal HW changes in the root complex and endpoint as will be described in more detail with respect to FIGS. 2-3.

Figure 2:
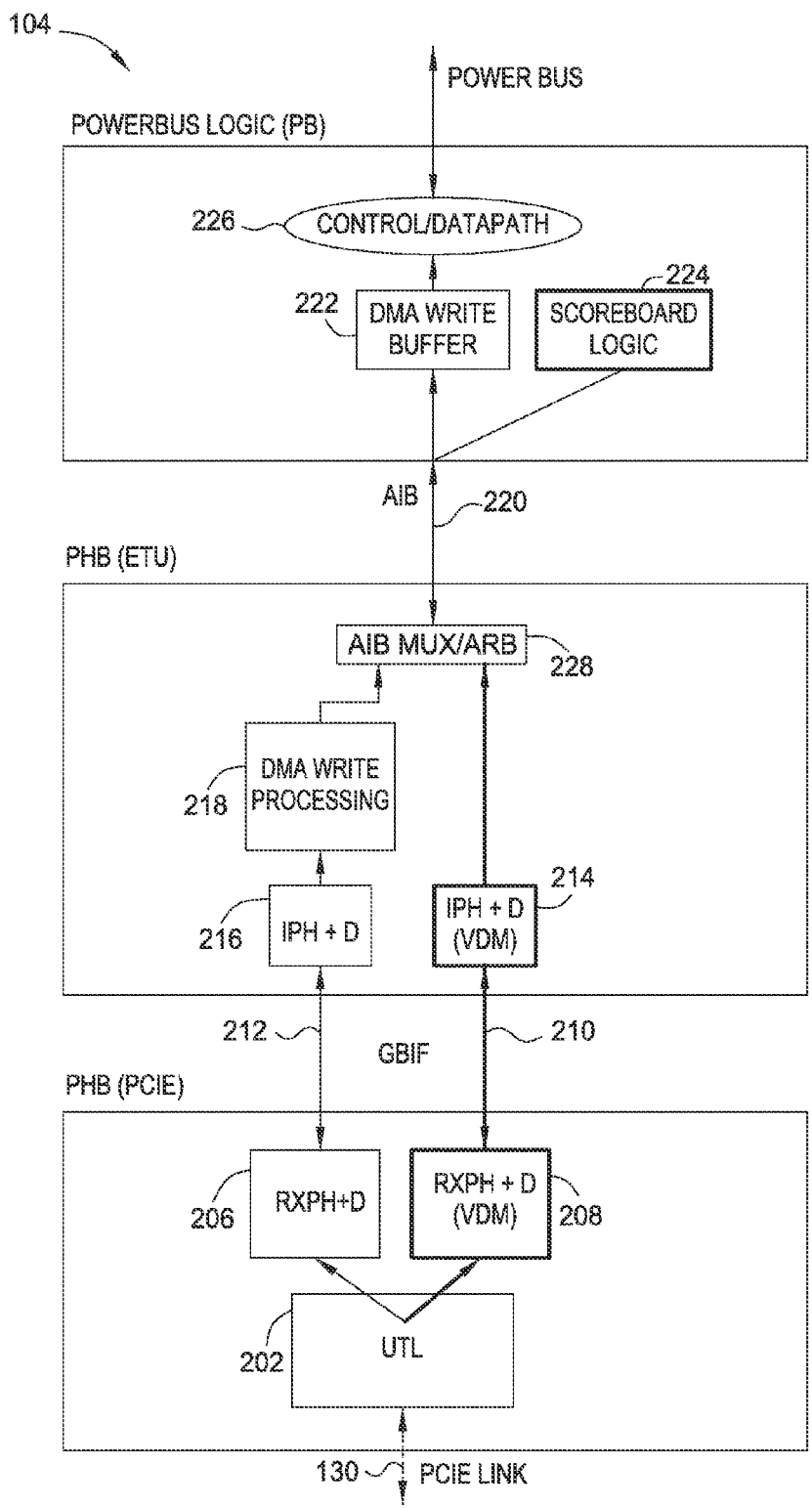
FIG. 2 illustrates a block diagram of a root complex device, according to certain embodiments of the present disclosure.

FIG. 2 illustrates block diagram of a root complex 104 configured to implement a second channel using VDMs, according to certain embodiments of the present disclosure. As illustrated, a PCIe host bridge (PHB) may include an upper transaction layer (UTL) 202 where inbound PCIe TLPs, received via PCIe link 130, may be decoded. For example, inbound TLPs may be split and stored in designated buffers by the PCIe/UTL logic. That is, memory write header and data may be placed in a receive posted header and data (RXPH+D) buffer 206, and VDM TLPs may be placed in a separate RXPH+D buffer 208 that is designated for VDMs. In certain embodiments, buffer 208 may be a duplicate of the buffer 206 used for memory writes for logic simplicity. That is, buffer 208 may be a same size as buffer 206. A dedicated global bus interface (GBIF) write interface 210 may be dedicated to VDMs. Thus, no ordering may be necessary between VDMs and DMA writes which use a separate GBIF write interface 212.

The root complex 104 also includes a dedicated inbound posted header and data (IPH+D) buffer 214 for VDMs in the PHB express transaction unit (ETU). That is, IPH+D buffer 214 for VDMs is a separate buffer than IPH+D buffer 216 used for normal DMA writes. In certain embodiments, buffers 214 and 216 may be small, e.g., each storing up to two write requests for the GBIF interface. As illustrated, VDM writes skip normal pipeline processing for normal DMA writes, performed at 218 in the ETU. Thus, VDMs are not ordered with normal DMA writes. The processed DMA writes and VDM are then multiplexed via an adaptive interface board (AIB) multiplexer and arbiter (ARB). The VDM writes are then assigned to a separate AIB channel than DMA writes, allowing the VDM writes to pass DMA writes at the AIB interface 220. For example, VDM writes may use channel 3 while DMA writes may use channel 0.

The root complex 104 also includes PowerBus Logic (PB), which includes a DMA write buffer 222 that may be shared with VDM writes. However, a PB scoreboard logic 224 may be configured to allow VDM writes to pass DMA writes to the PowerBus. For example, the PB scoreboard logic 224 may reserve at least one buffer slot for VDM writes such that DMA writes do not block VDM writes. In certain embodiments, the output of the DMA write buffer 222 is coupled with a control and data path 226 configured to send the DMA and VDM writes to the PowerBus.

Figure 3:
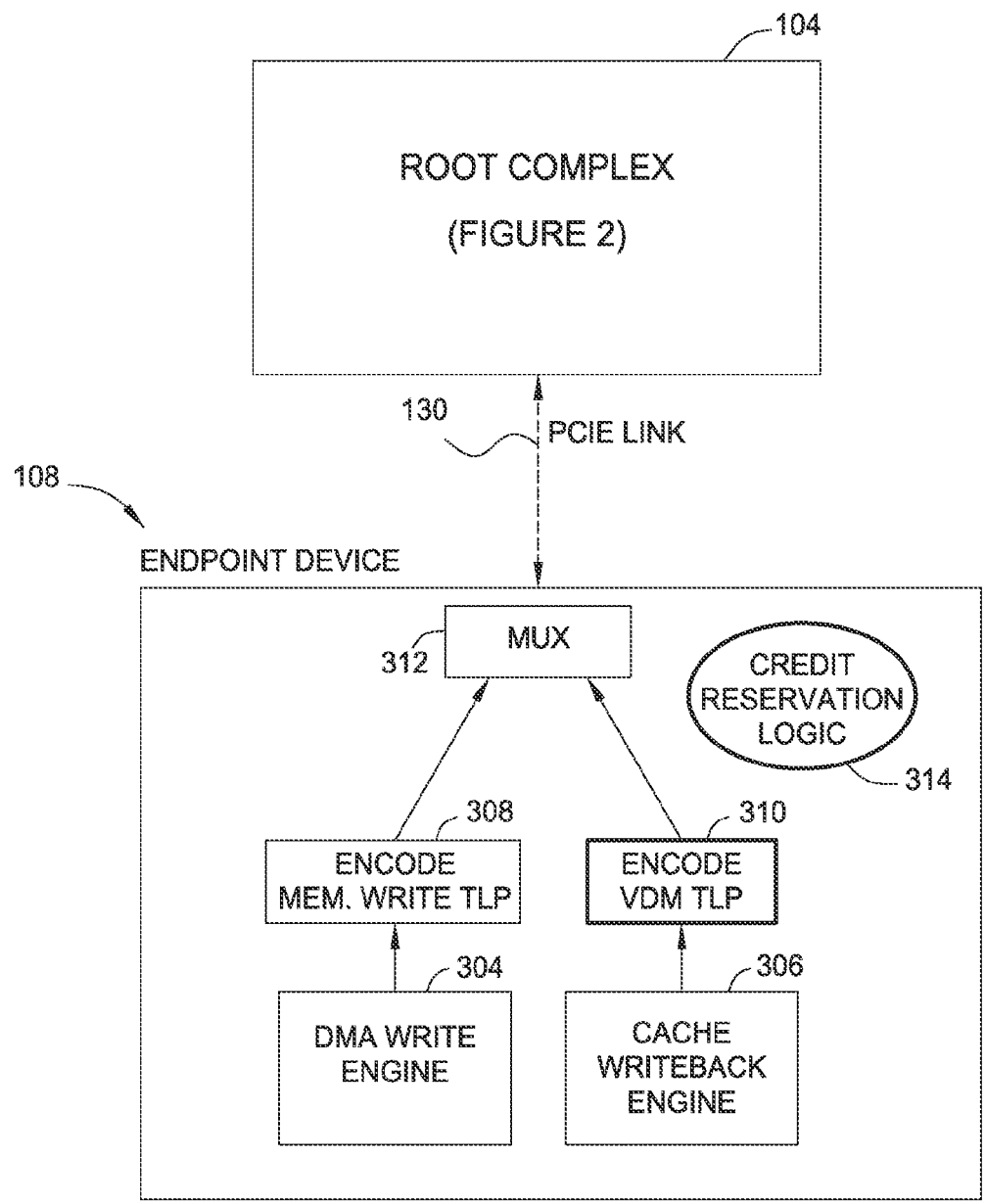
FIG. 3 illustrates a block diagram of an end point device, according to certain embodiments of the present disclosure.

FIG. 3 illustrates a block diagram of an end point device 108 configured to implement a second channel using VDMs, according to certain embodiments of the present disclosure. In certain embodiments, the end point device is directly attached to a root complex via a PCIe link 130. The end point device 108 may include a DMA write engine 304 configured to generate DMA write and logic 308 for encoding the DMA writes as memory write TLPs. The endpoint device 108 may also include a cache writeback engine 306 to generate cache writeback, and logic 308 for encoding the cache writebacks as VDM TLPs. The memory write TLPs and the VDM TLPs are multiplexed via a multiplexer 312, and sent via the PCIe link 130 to the root complex 104, as described with respect to FIG. 2.

In certain embodiments, the endpoint 108 also comprises credit reservation logic 314 configured to reserve a credit for the VDM writes in an effort to prevent VDMs from being blocked by the DMA memory writes. Generally, credits are used to indicate a number of TLPs that, for example, the end point 108 can send to the root complex 104. PCIe credits may be split into separate header and data credits for each type of transmission (e.g., posted, non-posted, completion). Endpoint 108 may be given a certain credit limit, and the endpoint 108 may only be allowed to send TLPs as long as sending the TLP would not result in the endpoint 108 exceeding its credit limit. Thus, in an effort to ensure that the endpoint 108 does not consume all of its available credits by sending normal memory writes, resulting in a block of VDM transmissions, the endpoint 108 credit reservation logic 314 may be configured to reserve a credit for VDMs. That is, the credit reservation logic 314 may ensure that the endpoint 108 only sends TLPs until at least one credit is left for VDMs to consume. Therefore, in certain embodiments, the credit reservation logic 314 may be configured to reserve a last credit of the available credits for the VDM TLPs.

Turning back to FIG. 2, the root complex 104 may be configured to return a number of credits to the endpoint 108, which indicates a number of TLPs that the endpoint 108 can receive. This indication may be based on a number of available slots in buffers configured to store the DMA and VDM TLPs. In certain embodiments, the root complex 104 may be configured to combine a number of allowed credits for DMA and VDM TLPs to determine a total number of available credits, which the root complex will return (e.g., indicate) to the endpoint device 108.

In certain embodiments, the posted header buffer of the IPH+D buffer 214 (VDM buffer) may reflect the number of posted header credits advertised. In certain embodiments, the data buffer of the IPH+D buffer 214 (VDM buffer) may be a different size than the normal write (e.g., DMA writes) data buffer of the IPH+D buffer 216. That is, in certain embodiments, there may be a maximum payload size for VDMs, which may be smaller than the maximum payload size of normal writes. Therefore, the size of the data buffer for VDMs (e.g., data buffer of IPH+D buffer 214) may be selected based on a number of headers times a maximum VDM payload size. By using a data buffer for the IPH+D buffer 214 (VDM buffer) that is smaller than a data buffer of the IPH+D buffer 216 (normal memory write buffer), the amount of area consumed by the IPH+D buffer 214 may be reduced.

Figure 4A:
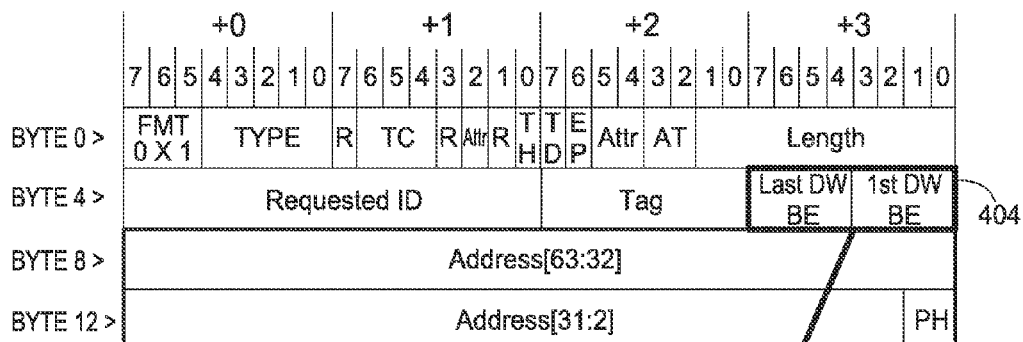
FIGS. 4A and 4B illustrate a technique for an endpoint device to prepare a VDM TLP header based on a format for a normal memory write header, according to certain embodiments of the present disclosure.
Figure 4B:
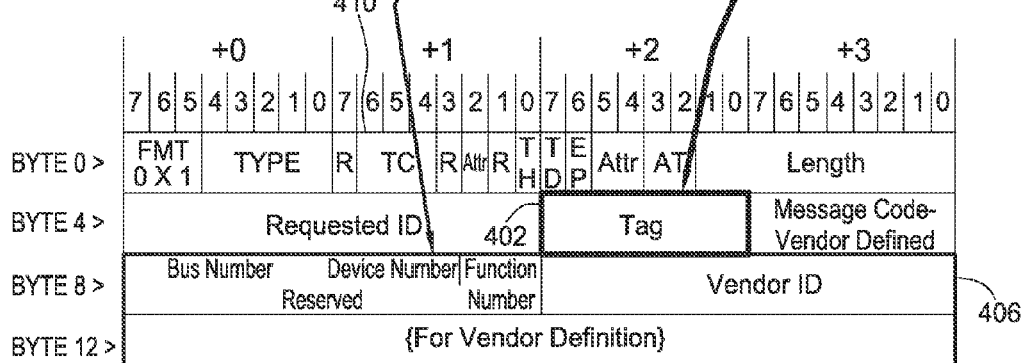

FIGS. 4A and 4B illustrate a technique for logic 310 of the endpoint 108 to prepare the VDM TLP header based on a format for a normal (e.g., DMA) memory write header, according to certain embodiments of the present disclosure. FIG. 4A illustrates an example request header format for 64-bit addressing of memory, and FIG. 4B illustrates an example header for VDMs. As illustrated, a Tag field (e.g., Byte 6) 402 of the VDM TLP header may be overloaded with the Last double-work byte enable (DW BE) and First ($1^{st}$) DW BE fields 404 of the normal memory write header format. That is, the Tag field 402 of the VDM header may be overloaded because it may not be used for cache writeback commands. Moreover, the message code (vendor defined) should be preserved because the message code distinguishes the command from other message types like power management messages, for example. As a result, the message code is not overloaded by other information.

In addition, bytes eight through fifteen 406 of the VDM header may be overloaded with the 64-bit address 408 as in the memory write header. That is, the reserved bus, device number, and function number fields in the VDM header are overloaded with address bits because these fields may not be required since the VDM may be routed to the Root Complex. The vendor identification (ID) field may also not be required and can also be overloaded with address bits.

Figure 5:
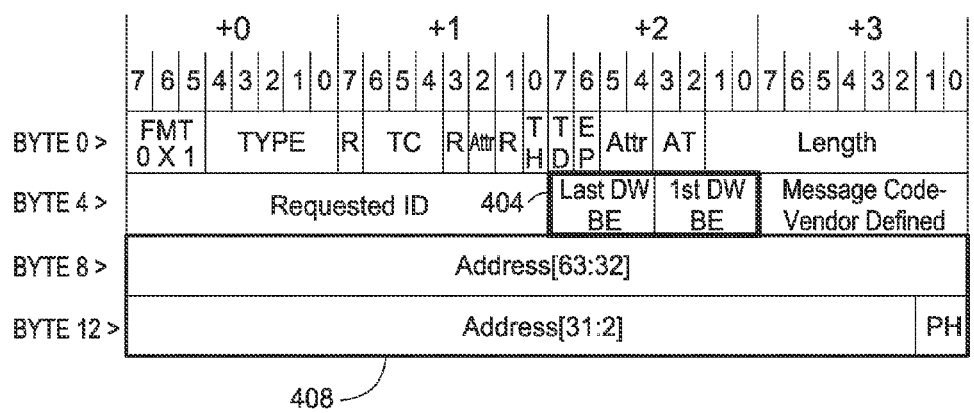
FIG. 5 illustrates a VDM header format, according to certain embodiments of the present disclosure.

FIG. 5 illustrates the VDM header format after the fields specified with respect to FIG. 4 have been overloaded, according to certain embodiments of the present disclosure. In certain embodiments, the Traffic Class (TC) field 410 may be used for other purposes. Moreover, the endpoint device 108 can choose to set the processing hint (PH) bit to a logic 1 for TLP processing hints. However, the Tag field 402 may not be used as a steering tag because it may be overloaded with the First/Last BEs as described with respect to FIG. 4.

Using VDMs provides several advantages over a PCIe-VC mechanism, such as simpler HW implementation. For example, the logic to encode and decode the new VDM TLP headers may be included in the endpoint 108 and root complex 104. RXPH+D buffer may be replicated in the root complex 104. The credit return coalescing in the root complex 104 and credit reservation schemes in the end point 108 are simpler. Moreover, additions or changes to the PCI configuration space may not be needed. No changes may be needed in the Link State Machine logic (LTSSM). Complicated credit management logic across multiple VCs may not be needed. Also, acquiring a second channel using VDMs may have simpler HW verification and simulation as compared to PCIe-VC scheme.

In addition, with VDMs, no SW or FW changes may be needed. That is, embodiments of the present disclosure may be completely transparent to the SW/FW. Thus, no SW and FW involvement may be needed with VDMs as may be needed in the PCIe-VC mechanism.

Moreover, embodiments of the present disclosure fit within the scope of the PCIe architecture. For example, messages with payloads are supported in the PCIe architecture. Overloaded fields in the new VDM header may not cause functional problems and may not conflict with current vendor implementations. In addition, embodiments of the present disclosure may be transparent to PCIe switches. VDMs may be routed correctly and are supported by switch vendors, and thus, no changes or functional additions may be needed. Overall, implementing a second channel using VDMs reduces design risk as compared to the PCIe-VC mechanism.

While examples provided herein have described sending cache writebacks using VDMs to facilitate understanding, persons of ordinary skill in the art will understand that embodiments of the present disclosure may be used to communicate any information between a root complex and an end point device in order to prevent the information from being blocked by normal memory writes.

Figure 6:
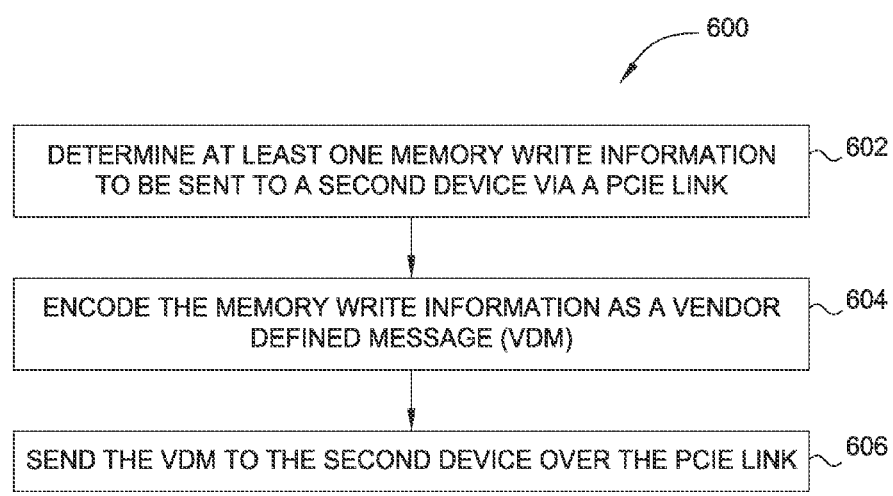
FIG. 6 illustrates example operations performed by an endpoint device, according to certain embodiments of the present disclosure.

FIG. 6 illustrates example operations 600 for using VDMs to send memory write information (e.g., a cache writeback), in accordance with embodiments of the present disclosure. The operations 600 may be performed, for example, by a first device, such as the endpoint device 108.

The operations 600 begin, at 602, by determining at least one memory write information to be sent to a second device via a PCIe link. At 604, the end point device encodes the memory write information as a vendor defined message (VDM) and, at 606, sends the VDM to the second device over the PCIe link.

Figure 7:
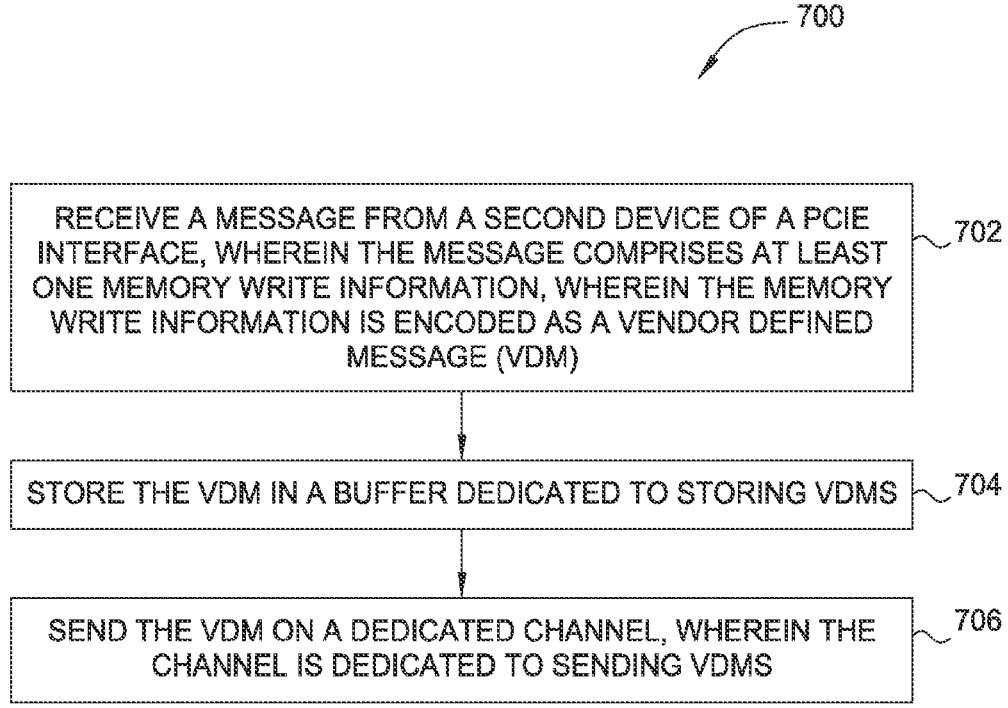
FIG. 7 illustrates example operations performed by a root complex device, according to certain embodiments of the present disclosure.

FIG. 7 illustrates example operations 700 for using VDMs to send memory write information (e.g., a cache writeback), in accordance with embodiments of the present disclosure. The operations 700 may be performed, for example, by a first device, such as the root complex device 104.

The operations 700 begin, at 702, by receiving a message from a second device of the PCIe interface, wherein the message comprises at least one memory write information, wherein the memory write information is encoded as a vendor defined message (VDM). At 704, the root complex device stores the VDM in a buffer dedicated to storing VDMs and, at 706, sends the VDM on a dedicated channel, wherein the channel is dedicated to sending VDMs.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method performed by a first device of a Peripheral Component Interconnect Express (PCIe) communication interface, comprising:
   determining at least one memory write information to be sent to a second device via a PCIe link;
   encoding the memory write information as a vendor defined message (VDM), wherein a header of the VDM is encoded based on a format of a direct memory access (DMA) header, wherein encoding the header of the VDM comprises encoding one or more fields of the header of the VDM with values that correspond to one or more fields of the DMA header; and
   sending the VDM to the second device over the PCIe link.

2. The method of claim 1, wherein the first device comprises an end point device, and the second device comprises a root complex device.

3. The method of claim 1, further comprising:
   receiving a plurality of credits indicating a number of packets allowed for the first device to send to the second device; and
   reserving at least one of the plurality of credits for sending the VDM.

4. The method of claim 3, wherein reserving the credit comprises reserving a last credit of the plurality of credits.

5. The method of claim 1, further comprising sending direct memory access (DMA) information to the second device via the PCIe link.

6. The method of claim 1, wherein the memory write information comprises a cache writeback.

7. The method of claim 1, wherein encoding the one or more fields of the header of the VDM with values that correspond to one or more fields of the DMA header further comprises:
   overloading the one or more fields of the header of the VDM with values that correspond to the one or more fields of the DMA header.

8. The method of claim 7, wherein overloading the one or more fields of the header of the VDM with values from the one or more fields of the DMA header further comprises:
   overloading a tag field of the header of the VDM with values that correspond to the last double-work byte enable (DW BE) and first DW BE fields of the DMA header.

9. The method of claim 7, wherein overloading the one or more fields of the header of the VDM with values from the one or more fields of the DMA header further comprises:
   overloading a reserved bus field, a device number filed, and a function number field of the header of the VDM with values that correspond to a first address field of the DMA header.

10. The method of claim 7, wherein overloading the one or more fields of the header of the VDM with values from the one or more fields of the DMA header further comprises:
    overloading a vendor identification field of the header of the VDM with values that correspond to a second address field of the DMA header.

11. A method performed by a first device of a Peripheral Component Interconnect Express (PCIe) communication interface, comprising:
    receiving a message from a second device of the PCIe interface, wherein the message comprises at least one memory write information, wherein the memory write information is encoded as a vendor defined message (VDM), and a header of the VDM is encoded based on a format of a direct memory access (DMA) header, wherein one or more fields of the header of the VDM is encoded with values that correspond to one or more fields of the DMA header;
    storing the VDM in a buffer dedicated to storing VDMs; and
    sending the VDM on a dedicated channel, wherein the channel is dedicated to sending VDMs.

12. The method of claim 11, wherein the message further comprises direct memory access (DMA) information, the method further comprising sending the DMA information on another channel.

13. The method of claim 11, wherein the first device comprises an end point device, and the second device comprises a root complex device.

14. The method of claim 11, wherein the dedicated buffer for storing VDMs comprises a dedicated posted header and data buffer.

15. The method of claim 11, wherein the memory write information comprises a cache writeback.

16. The method of claim 11, further comprising:
    combining a number of credits allowed for VDM information and DMA information that can be received by the first device; and
    sending an indication of the combined number of credits to the second device.

* * * * *